United States Patent
Atac et al.

(10) Patent No.: US 10,902,275 B2
(45) Date of Patent: Jan. 26, 2021

(54) METHOD AND SYSTEM FOR MONITORING SAFETY CRITICAL SYMBOLS ON A DISPLAY

(71) Applicant: THALES DEFENSE & SECURITY, INC., Clarksburg, MD (US)

(72) Inventors: Robert B. Atac, Batavia, IL (US); Mark W. Edel, Downers Grove, IL (US); Herve Claret, Clarksburg, MD (US)

(73) Assignee: THALES DEFENSE & SECURITY, INC., Clarksburg, MD (US)

(*) Notice: Subject to any disclaimer, the term of this patent is extended or adjusted under 35 U.S.C. 154(b) by 121 days.

(21) Appl. No.: 16/192,585

(22) Filed: Nov. 15, 2018

(65) Prior Publication Data
US 2019/0147281 A1    May 16, 2019

Related U.S. Application Data (60) Provisional application No. 62/587,204, filed on Nov. 16, 2017.

(51) Int. Cl.
| | | |
|---|---|---|
| G06K 9/36 | (2006.01) | |
| G06K 9/20 | (2006.01) | |
| G02B 27/01 | (2006.01) | |
| G06F 9/38 | (2018.01) | |
| G06K 9/62 | (2006.01) | |

(52) U.S. Cl.
CPC ....... *G06K 9/2072* (2013.01); *G02B 27/0101* (2013.01); *G06F 9/3877* (2013.01); *G06K 9/2054* (2013.01); *G06K 9/6202* (2013.01); *G02B 27/01* (2013.01)

(58) Field of Classification Search
CPC .. G06F 9/3877; G06K 9/2072; G06K 9/2054; G06K 9/6202; G02B 27/0101; G02B 27/01
USPC ......................................................... 382/232
See application file for complete search history.

(56) References Cited

U.S. PATENT DOCUMENTS

| | | |
|---|---|---|
| 6,822,624 B2 | 11/2004 | Naimer et al. |
| 7,212,175 B1 | 5/2007 | Magee et al. |
| 2017/0177937 A1* | 6/2017 | Harmsen ................ G05D 1/101 |

OTHER PUBLICATIONS

International Search Report and Written Opinion, issued by International Searching Authority in corresponding International Application No. PCT/US2018/061530, dated Jan. 22, 2019, (PCT/ISA/210, PCT/ISA/220, & PCT/ISA/237).

* cited by examiner

*Primary Examiner* — Huy C Ho
(74) *Attorney, Agent, or Firm* — Arent Fox LLP (57) ABSTRACT

The present disclosure relates generally to a system and method for monitoring a display output of a graphics processing unit ("GPU"), and more particularly, to monitoring safety critical symbols of a commercial off the shelf ("COTS") GPU to ensure a high level of accuracy of the display output to be displayed to a user. The generated display output signal of the COTS GPU may be encoded with specific reference points within a generated image, and compared to a predicted image for the monitoring device having corresponding specific reference points. By having specific reference points in the encoded display output signal of the COTS GPU, the monitoring device may significantly reduce processing and throughput but focusing the comparison on only the specific encoded reference points and thereby confirming the accuracy of the COTS GPU.

18 Claims, 7 Drawing Sheets

METHOD AND SYSTEM FOR MONITORING SAFETY CRITICAL SYMBOLS ON A DISPLAY

CROSS-REFERENCE TO RELATED APPLICATIONS

This application claims the benefit of U.S. Provisional Application Ser. No. 62/587,204, entitled "METHOD AND SYSTEM FOR MONITORING SAFETY CRITICAL SYMBOLS ON A DISPLAY" and filed on Nov. 16, 2017, which is expressly incorporated by reference herein in its entirety.

BACKGROUND

Field

The present disclosure relates generally to monitoring a display output of a graphics processing unit ("GPU"), and more particularly, to monitoring safety critical symbols of a commercial off the shelf ("COTS") GPU to ensure a high level of accuracy and integrity of the display output to be displayed to a user.

Background

Military and pilots use a head-mounted display ("HMD") to display tactical and mission critical information, such as maps, airspeed, altitude, heading, horizon, etc., while contemporaneously viewing a real scene. For example, a head-mounted display may be used to superimpose the tactical and mission critical information on the real scene to create an augmented reality ("AR"). One of the technological challenges for displaying tactical and mission critical information is that the software and hardware associated with the displaying process must be rated at a specified Development Assurance Level ("DAL"), for example, a high level A.

However, many graphics processing units are not suitable for such uses as military and governmental applications. For example, many graphics processing units such as a COTS unit cannot be certified as a DAL—level A without additional assurances that the video output data, to be displayed, is void of bad or misleading information.

Thus, there remains an unmet need for a COTS GPU that implements a monitoring method and/or system to ensure that the video output to a display unit is void of bad or misleading information. Further, there remains a need for a monitoring method and system that minimizes the processing necessary to ensure the accuracy of a COTS GPU to a DAL—Level A.

SUMMARY

In light of the above described problems and unmet needs, as well as others, aspects of the present disclosure provides a system and method for monitoring safety critical symbols on a display provided by a COTS GPU. In an aspect, a monitoring method and system are employed to monitor the display output signal of a COTS GPU to ensure the accuracy of a generated image on a display. In one example implementation, the generated display output signal of the COTS GPU is encoded with one or more specific reference points within a generated image, and compared to a generated predicted image of what would be displayed on the monitoring device that has similarly located specific reference points. By having specific reference points in the encoded display output signal of the COTS GPU and the generated predicted image, the monitoring device is able to significantly reduce processing and throughput by focusing the comparison on only the specific encoded reference points, rather than the entire image, for example.

In an aspect of the present disclosure, if the monitoring device determines the generated display output signal of the COTS GPU to be accurate, the monitoring device removes the encoded specific reference points, and displays an image on the display device to a user/pilot, for example, without the reference points.

In an aspect of the present disclosure, if the monitoring device determines the generated display output signal of the COTS GPU not to be accurate, the monitoring device shuts off operation of the display device for the user/pilot. For example, rather than the user/pilot relying on inaccurate information presented on the display device, the user/pilot would refer to other instruments for operation.

Among other advantages, use of a method and system in accordance with aspects of the present disclosure may allow use of lower certification level GPUs to be implemented into systems requiring higher certification levels.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of monitoring and display features will now be presented with reference to various systems, apparatuses, and methods. These systems, apparatuses, and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

Generally, Software Considerations in Airborne Systems and Equipment Certification ("SCASEC") is a guideline dealing with the safety of safety-critical software used in certain airborne systems. The Software Level, also known as the DAL, or also Item Development Assurance Level ("IDAL") is determined from the safety assessment process and hazard analysis by examining the effects of a failure condition in the system.

The failure conditions are categorized by their effects on the aircraft, crew, and passengers. Catastrophic failure may cause a crash. For example, such failure may result from the error or loss of critical functions required to safely fly and land aircraft. Hazardous failure has a large negative impact on safety or performance, or reduces the ability of the crew to operate the aircraft due to physical distress or a higher workload, or causes serious or fatal injuries among the passengers. Major failure is significant, but has a lesser impact than a Hazardous failure. For example, Major failure leads to passenger discomfort rather than injuries, or significantly increases crew workload. Minor failure is noticeable, but has a lesser impact than a Major failure. For example, Minor failure may include causing passenger inconvenience or a routine flight plan change. No Effect failure has no impact on safety, aircraft operation, or crew workload.

The failure conditions stated above correspond to ratings from A, being the highest, to E, being the lowest. Thus, catastrophic failure is rated as an "A", and software certified at this level must have a minimum failure rate of $10^{-9}$/h (per hour). Hazardous failure is rated as a "B", and software certified at this level must have a minimum failure rate of $10^{-7}$/h. Major failure is rated as a "C", and software certified at this level must have a minimum failure rate of 10–5/h. Minor failure is rated as an "D", and software certified at this level must have a minimum failure rate of 10–3/h. No Effect failure is rated as an "E", and software certified at this level does not have a minimum failure rate.

Any software that commands, controls, and/or monitors safety-critical functions should receive the highest DAL certification, for example, Level A. A GPU certified at a DAL—Level A is exponentially more expensive than a COTS GPU. Additionally, because a COTS GPU is not certified at a DAL—Level A, such devices may not be implemented in a system that commands, controls, and/or monitors safety-critical functions. For example, such devices may not be properly implemented for use in military functions.

Generally, a COTS GPU may be certified at a DAL—Level A if a monitoring method and/or system is implemented to ensure that the video output is providing correct information. The monitoring system and/or method will thereby ensure that, although a lower DAL certification of a COTS GPU is outputting display data, the output meets DAL—Level A certification. Additionally, the monitoring method and/or system needs to be performed nearly instantaneously to a user/pilot, as any substantial delay of the display image to a user/pilot may cause a loss of the aircraft.

According to one aspect of the present disclosure, the system and method described below provides for a technique of implementing a COTS GPU with a certification below a DAL—Level A, in a system/device that requires a DAL—Level A certification. Through monitoring of an output signal of the COTS GPU, the system and method may ensure the accuracy of the generated images meets or exceeds the certification of DAL—Level A. For example, although the COTS GPU may generate an image with critical information symbols and non-critical information symbols, as further described below, the DAL certification may be based upon the accuracy of the critical information symbols.

According to one aspect of the present disclosure, the system and method described below provides for improved efficiency in monitoring, as the monitoring needs only to be used to review specific points in a generated image to determine if the output signal meets or exceeds the certification of DAL—Level A. In one aspect of the present disclosure, the specific points are located and confirmed for accuracy within the most important information to a user/pilot. For example, although the COTS GPU may provide erroneous information regarding non-critical information, e.g., air temperature, the monitoring system may ensure that other, more critical information, for example, is accurate.

Accordingly, in one or more embodiments, the functions described below may be implemented in any one of a HIVID, a Heads-Up Display ("HUD"), a Multi-Function Display ("MFD"), or a Head-Worn Display ("HWD"). Further, these terms may also be used interchangeably with the phrase "video display for a user/pilot."

Figure 1:
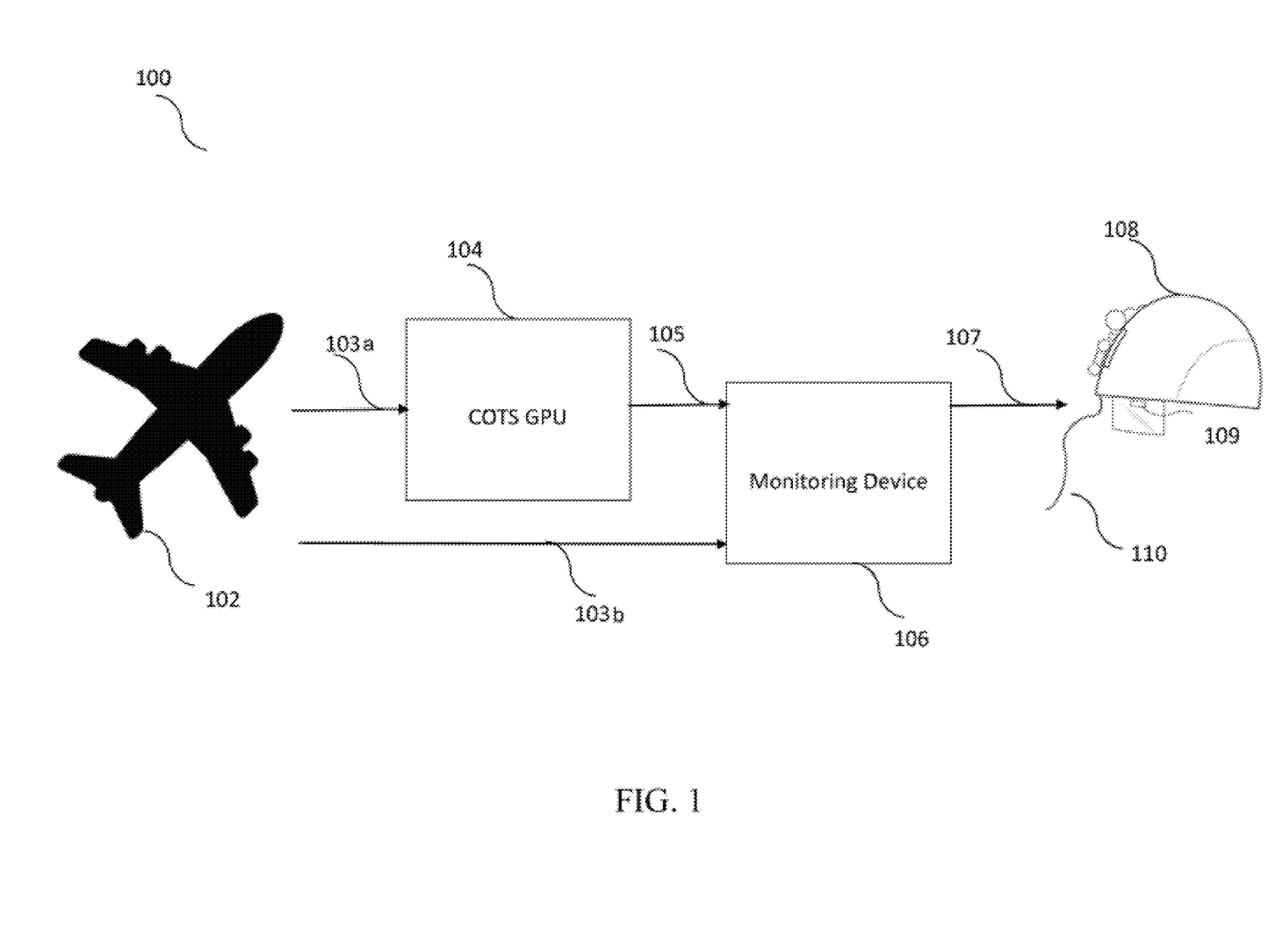
FIG. 1 is a diagram illustrating a schematic view of an example of a critical symbol monitoring system according to one aspect of the present disclosure.

Referring to FIG. 1, illustrated is a representative diagram of an example critical symbol monitoring system 100 according to one aspect of the present disclosure. System 100 may include a raw data generating device 102. For example, this device may be an aircraft, other forms of transportation, and/or ground devices that obtain and generate raw data containing both critical and non-critical information. For example, the raw data may be obtained and generated from radar, barometers, pitot tubes, a compass, or the like. This raw data may also include critical information of air speed, horizon, heading, altitude, etc. Additionally, the raw data generating device 102 may generate non-critical data that can be used by pilots, passengers, and crew, such as outside air temperature, in addition to the critical information.

In one aspect of the present disclosure, the critical symbol monitoring system 100 may include a COTS GPU 104. The COTS GPU may include, for example, a specialized electronic circuit designed to rapidly manipulate and alter memory to accelerate the creation of images in a frame buffer intended for output to a display device. In one aspect, the COTS GPU 104 may generate a plurality of different images to be displayed on the HWD 109, as described in detail below. For example, a horizon line, heading, airspeed, altitude, temperature, targets, fuel, other aircraft positions and/or information, etc., may be generated For purposes of the description, the horizon line, heading, airspeed and altitude may be considered the "critical information," as referred to herein, as a failure of any one of these symbols displayed may potentially cause a complete loss of the aircraft by the pilot. In one aspect of the present disclosure, the raw data containing critical information may be transmitted 103a from the raw data generating device 102 to the COTS GPU 104 for further processing.

Figure 2A:
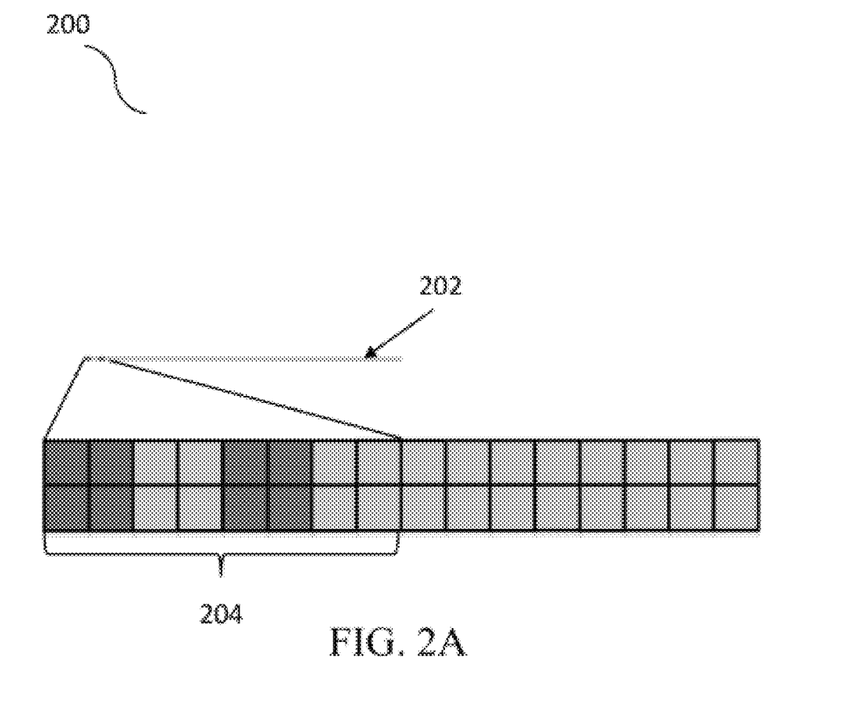
FIGS. 2A and 2B show an example of an output of a COTS GPU according to an aspect of the present disclosure.
Figure 2B:
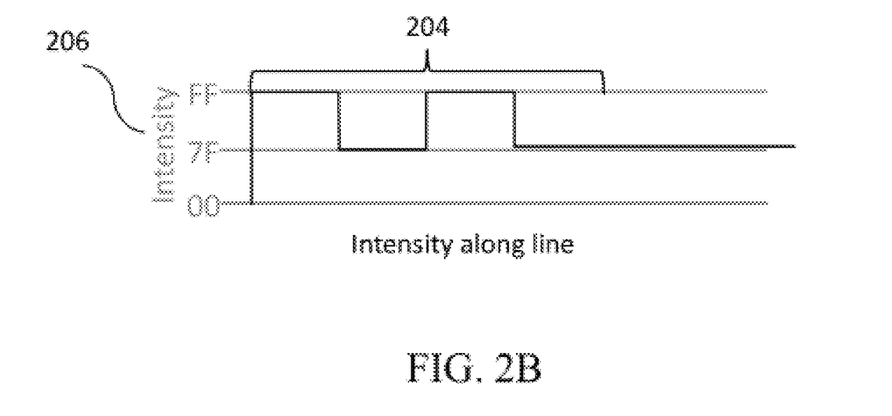

In an aspect, the COTS GPU 104 may receive 103a the raw data containing critical information, in additional to non-critical data, and may generate a display output signal containing critical information symbols for each of the respective critical information. For example, the display output signal may contain critical information symbols such as a horizon line, numbers indicative of airspeed, and/or numbers, letters and/or symbols indicative of headings. The critical information symbols may further be encoded by the COTS GPU with additional marks for additional processing by the monitoring device 106. Various aspects of the encoding will be described in more detail below in FIG. 2. The generated encoded display output data may be transmitted 105 from the COTS GPU to the monitoring device 106. In one aspect, the generated encoded display output data 105 may be produced in a form that may be used by a HWD 109 to generate and display the critical symbols on the HWD for the user/pilot.

In an aspect, the COTS GPU 104 may also receive 103a the raw data containing non-critical information, in additional to the critical data, and may generate a display output signal containing non-critical information symbols. For example, the display output signal may contain non-critical information symbols such as other aircraft, numbers indicative of air temperature, numbers, letters and/or symbols indicative of targets. The non-critical information symbols may not be encoded by the COTS GPU with additional marks for additional processing by the monitoring device 106. The generated encoded display output data may be transmitted 105 from the COTS GPU to the monitoring device 106. In one aspect, the generated display output data 105 may be produced in a form that may be used by a HWD 109 to generate and display the non-critical symbols on the HWD for the user/pilot.

In one aspect of the present disclosure, the critical symbol monitoring system 100 may include a monitoring device 106. The monitoring device 106 may receive 103b the raw data generated by the raw data generating device 102, and may generate, interpolate, and/or otherwise perform processing to produce other processed output, such as to the location, expected position, and symbol of each of the critical information symbols corresponding to each of the respective critical information (such generation, interpolation, and/or otherwise processing of the raw data interchangeably also being referred to herein as generating "hypotheses"). For example, the monitoring device 106 may determine that the critical information symbol of a horizon line should be located at a specific location on the HWD 109, such as in the middle of the wearer's view and extending parallel to the bottom of the image frame viewed by the wearer when the aircraft is flying levelly. Additionally, for example, the monitoring device 106 may determine that the critical information symbols of airspeed should be displayed by a specific number in a specific location on the HWD 109; for example, the air speed of the aircraft (e.g., 200 MPH) may be displayed in the top right corner of the frame viewed by the wearer. The hypotheses may be based on the raw data containing the critical information generated by the raw data generating device 102.

In one aspect of the present disclosure, the monitoring device 106 may not determine a hypotheses for the non-critical information symbols. Through the process of performing the hypotheses on the critical symbols and not the non-critical symbols a faster processing time may be obtained during the comparison step of the monitoring device 106, as described below.

In an aspect, as described above, the monitoring device 106 may also receive the generated encoded display output data and the generated non-encoded display output data transmitted 105 from the COTS GPU 104, containing both the critical information and the non-critical information symbols, respectively. As described in detail below, the monitoring device 106 may compare the generated hypotheses of the critical information symbols to the encoded display output data 105 that is produced in a form used by a HWD 109 to generate the an image on the HWD for the user/pilot containing both the critical information symbols and non-critical information symbols.

In one aspect of the present disclosure, the critical symbol monitoring system 100 may include a helmet 108 used by a user/pilot containing a HWD 109. The helmet 108 may also include a coupling 110 to other raw data generating devices 102 (e.g., an aircraft) for receiving additional data, for example, relating to motion tracking, etc.

Referring to FIGS. 2A and 2B, example representative diagrams of example output of a COTS GPU 200 according to an aspect of the present disclosure are shown. The COTS GPU 104 (FIG. 1) may generate 105 encoded display output data. For example, generated encoded display output data may include critical symbols, as described above. For example, as shown in FIG. 2A, a critical symbol may include a generated horizon line 202. As illustrated in FIG. 2A, the example generated horizon line 202 may be encoded with two darker marks, as shown in the close-up subsection 204 of line 202. If not removed by the motoring device, as described below, the two darker marks may be invisible or not clearly discernable to a pilot/user, and may be used by the monitoring device 105, for example. In an aspect, the encoded marks may be located at the endpoints of a symbol, as shown in FIG. 2A of the horizon line, that may allow for a faster identification and comparison by the monitoring device 106 (FIG. 1), described below.

In an aspect, as shown in FIG. 2B, the symbols output by the COTS GPU may be generated, for example, primarily at a ½ intensity level (7F, as shown for intensity 206) to form lines a minimum of two pixels wide. The darker pixels, to produce marks, for example, may be generated at 1 intensity level (FF as shown for intensity 206). The critical symbols displayed on a HWD may be generated at least 1 milliradian ("mrad") wide for purposes of visibility in bright conditions. For example, each pixel as illustrated by horizon line close up 204 in FIG. 2A may comprise an approximately 0.5 mrad sided square. Thus, the marks formed by the dark portions illustrated in close up 204 form an approximately 1.0 mrad sided square. Further, the intensity of the pixels may be designed in a grayscale from 1 to 256. Further to as described above, for example, the 7F intensity 206 may be 128 in a grayscale, and FF intensity 206 may be 256 in a grayscale.

In an aspect, each critical symbol generated by the COTS GPU 104 (FIG. 1) and transmitted by the encoded display output data 105 (FIG. 1), may be encoded with marks along the lines as illustrated in FIGS. 2A and 2B. For purposes of the example implementation described herein, only the horizontal line example will be referenced, but any critical symbol described herein similarly may be implemented with such encoding.

Figure 3A:
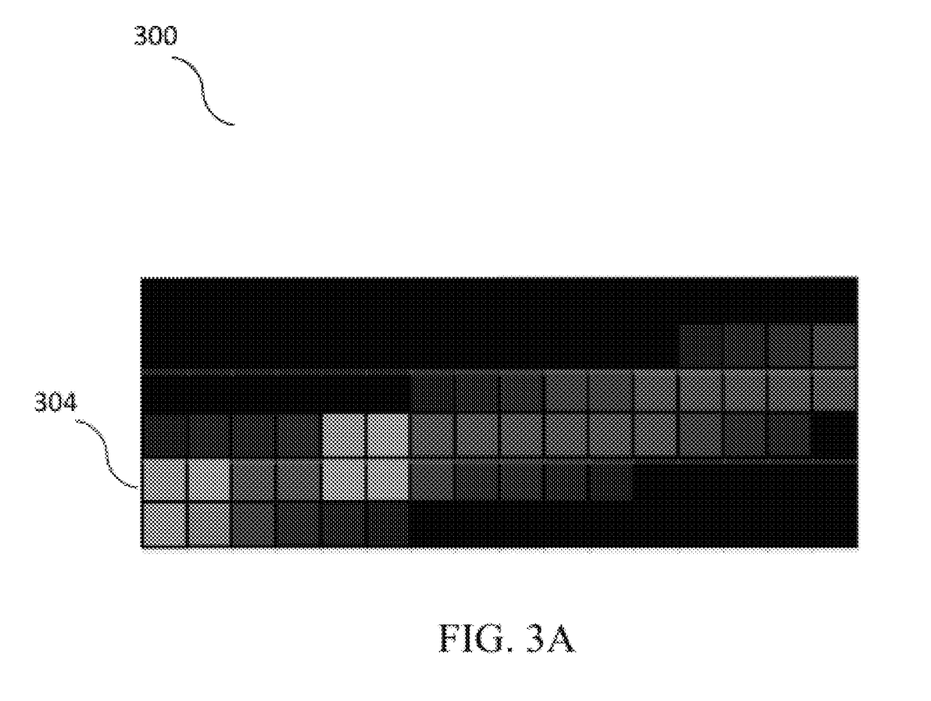
FIGS. 3A and 3B show an example of an output of a COTS GPU according to an aspect of the present disclosure.
Figure 3B:
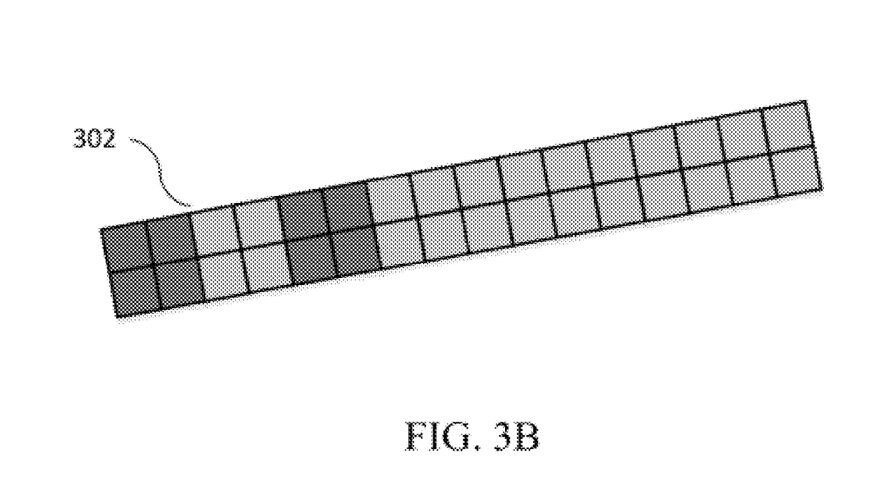

Referring to FIGS. 3A and 3B, illustrated are representative views of further example output of a COTS GPU according to an aspect of the present disclosure. In an aspect, to eliminate the jagged edges of a pixelated display, among other purposes, an anti-aliasing technique may be employed. Anti-aliasing may be employed to add thereby greater realism to a digital image by smoothing the jagged edges on curved lines and diagonals, for example. FIG. 3B illustrates a close up view of an example encoded critical symbol 302 produced along these lines, and FIG. 3A illustrates how anti-aliasing may affect the intensity of individual pixels in an image 304. Similar to as described above with reference to FIGS. 2A and 2B, the 2 pixel minimum width may help ensure that the endpoint marks remain distinct and visible for purposes of use by the monitoring device 106 (FIG. 1).

Figure 4:
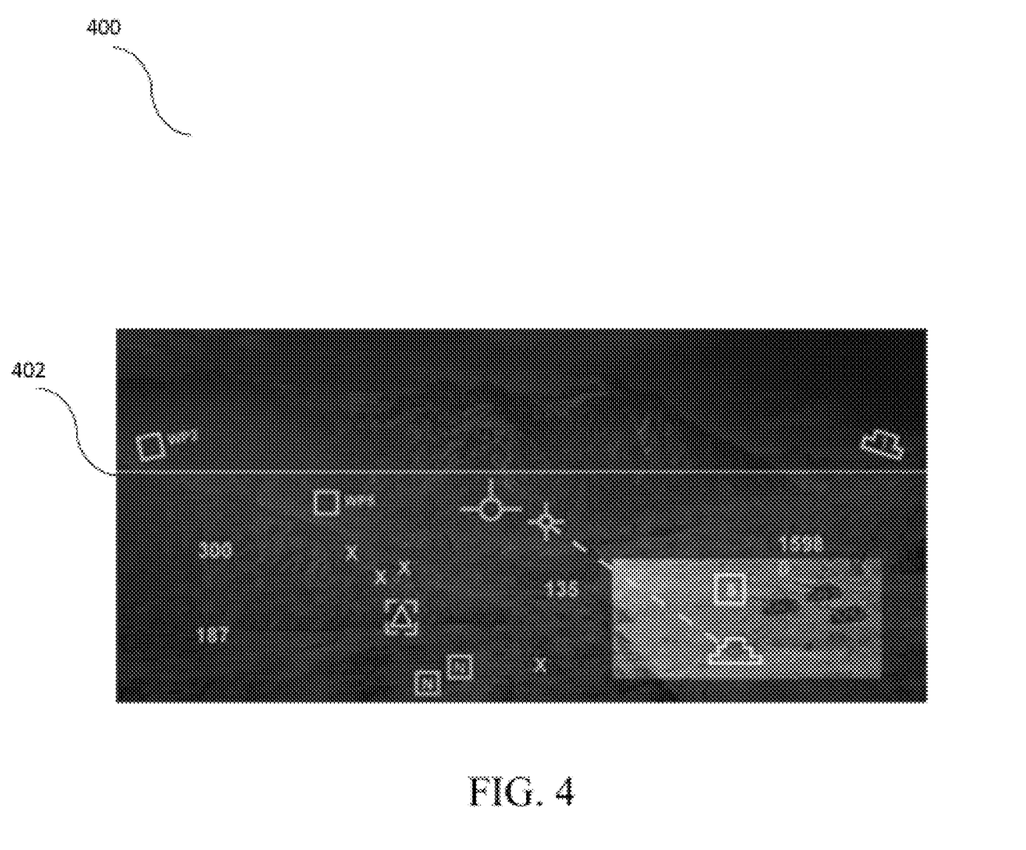
FIG. 4 is an example of an output comprising critical symbols on a AR HUD according to an aspect of the present disclosure.

Referring to FIG. 4, illustrated is another example of an output comprising critical symbols and non-critical symbols on an AR HWD according to an aspect of the present disclosure. In an aspect, the HWD 109 (FIG. 1) may display received doubled intensity level display output data 107 (FIG. 1) in the form illustrated in the example HWD display portion 400 shown in FIG. 4. Specifically, for example, a confirmed accurate critical information symbol representing a horizon line 402 may be displayed to a user/pilot.

Figure 5:
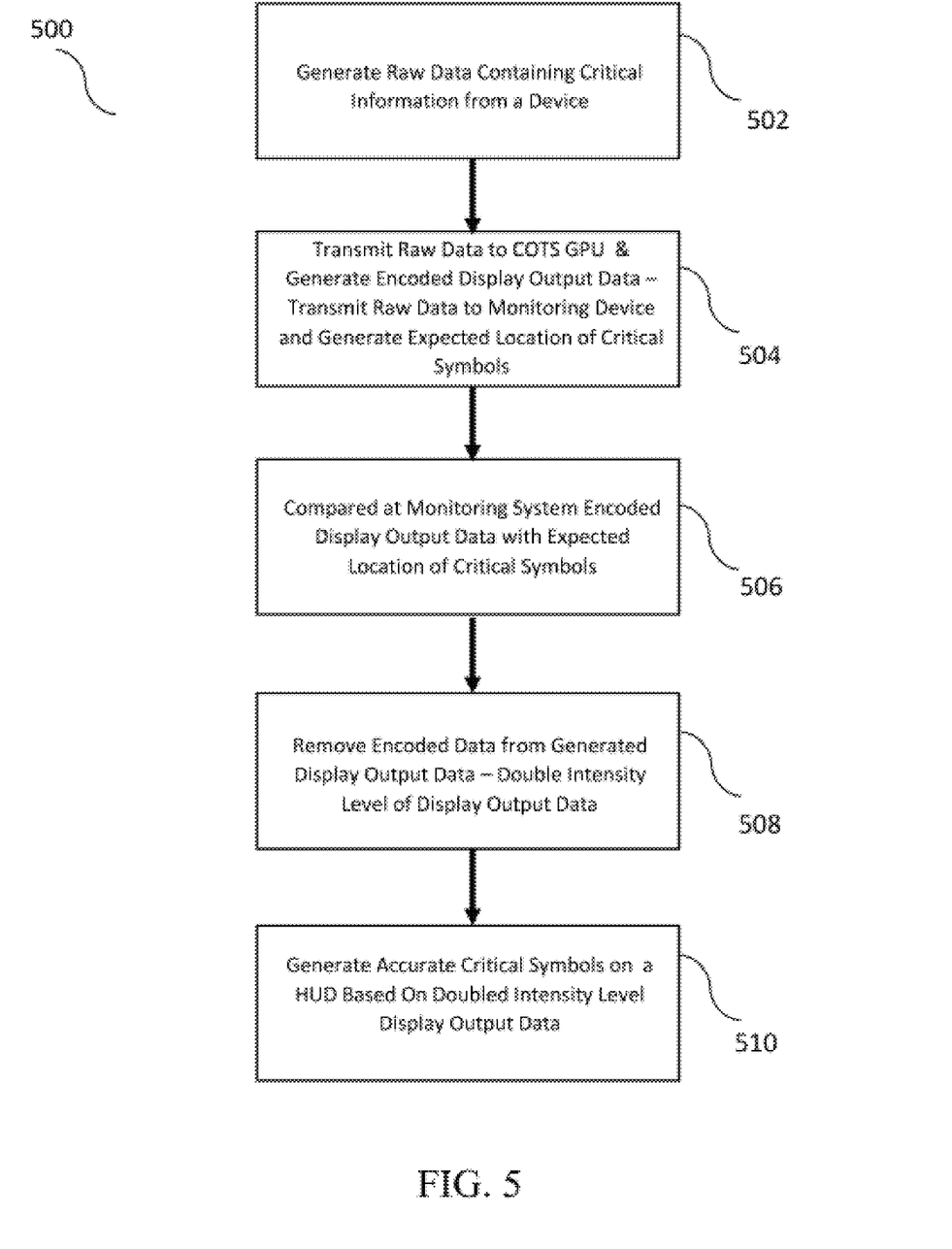
FIG. 5 is a flowchart of a method for monitoring critical symbols on a display in accordance with aspects of the present disclosure.

FIG. 5 is a flowchart 500 of an example method of monitoring critical symbols generated by a COTS GPU on a display (e.g., HWD 109 of FIG. 1), in accordance with aspects of the present disclosure. In block 502, raw data containing both critical information and non-critical information is generated from a device. For example, as described above, such information may be generated by raw data generating device 102 of FIG. 1.

In block 504, the generated raw data may be transmitted, for example, to the COTS GPU 104 (FIG. 1), per FIG. 1, as described above. Further, in block 504, the generated raw data may also be transmitted to the monitoring device (e.g., device 106 of FIG. 1). In an aspect, the COTS GPU 104 (FIG. 1), for example, may generate the encoded display output data and transmit the encoded display output data to the monitoring device 106, as shown and described above with respect to FIGS. 1-3. As describe above, the encoded display output data may contain both encoded critical information symbols and non-encoded non-critical information symbols.

In an aspect, the monitoring device 106 (FIG. 1), may generate, for example, an expected location of the critical information symbols based on the generated raw data 103. For example, the expected location may be a hypothesis, as described above. Because the certification of a DAL Level of a GPU is based upon the accuracy of the generated critical information symbols, the monitoring device may focus on only these symbols when generating a hypothesis. In an aspect of the present disclosure, the monitoring device 106 (FIG. 1) may receive the encoded display output data from the COTS GPU 104 (FIG. 1.), as shown and described with respect to FIGS. 1-3.

In block 506, the monitoring device 106 identifies the endpoints, also referred to herein as the "marks" within the critical symbols, of the encoded display output data, as described above. The monitoring device 106 (FIG. 1) may determine the location of the endpoints, marks, and compare the determined location, for example, to the expected location of the critical information symbols, the hypothesis. For example, the monitoring device (FIG. 1) 106 may determine that the encoded darker pixels are positioned at some arbitrary identified locations A and B. The monitoring device may then compare these determined positions to the generated hypothesis previously determined from the generated raw data. In an aspect of the present disclosure, the monitoring device 106 (FIG. 1) may identify and compare each mark of each critical information symbol to a respective corresponding generated hypothesis.

In one aspect, the monitoring device 106 (FIG. 1) may contain some tolerance of variance in the comparison, for example, within an error range of a couple of pixels. This tolerance may be predetermined based on SCASEC guidelines, for example. If the monitoring device determines each critical information symbol is generated in an accurate location, within the tolerance range, the image will be presented to a user/pilot, as described below.

In an aspect, the monitoring device 106 (FIG. 1) need only to identify specific positions of the marks within the critical symbols. As described above, a DAL Level certification may be based upon a GPU generating accurate critical information symbols. For example, the monitoring device may receive the encoded display output data and attempt to identify marks within the critical information symbols based upon the determined hypothesis, explained above. Without the determined hypothesis, the monitoring device 106 (FIG. 1) may spend additional processing time attempting to locate marks. Because other non-critical information symbols may be present within the display output data, the monitoring device would therefore expend additional resources and processing time attempting to filter the critical information symbols from the non-critical information symbols. Thus, the monitoring device 106 (FIG. 1.) greatly increases processing time and greatly reduces power consumption, by focusing on identifying marks in the critical information symbols based on the determine hypothesis. Thus, for example, only specific locations need to be identified by the monitoring device 106 in order to determine that the critical symbols are accurately produced by the COTS GPU 104.

In block 508, when the monitoring device 106 determines, based on the comparison in block 506, that the encoded marks are located within a tolerable variance of each critical information symbol, the encoded data is removed from the generated display output data. As described above in FIGS. 2A and 2B, the encoded marks, pixels, were encoded, by generating pixels at an intensity level of 1, and the non-encoded pixels were generated at an intensity level of ½. In one aspect, upon determination that the critical information symbols are accurately generated by the COTS GPU, the monitoring device removes the encoded marks by reducing the entire intensity of the encoded display output data to ½ intensity. For example, the intensity of all of the pixels may be lowered to 7F, as described above.

Further, in block 508, upon reduction of the intensity of all pixels to ½ intensity, the monitoring device (e.g., device 106 of FIG. 1) may multiply all pixels by 2, so that all of the pixels are at a full 1 in intensity. This operation may be performed so the image generated by the HWD 109 (FIG. 1) is at a level most visible to a user/pilot. The double intensity level of the display output data may be transmitted to the HWD 109 in order to be displayed to a user/pilot, shown in FIG. 1.

In an aspect, when the monitoring device, for example, determines, based on the comparison of block 508, that the encoded marks are not located within a tolerable variance, the HWD (e.g., HWD 109 of FIG. 1), may be disengaged. Thus, for example, the user/pilot will not errantly rely on inaccurate critical symbols generated by the COTS GPU.

Figure 6:
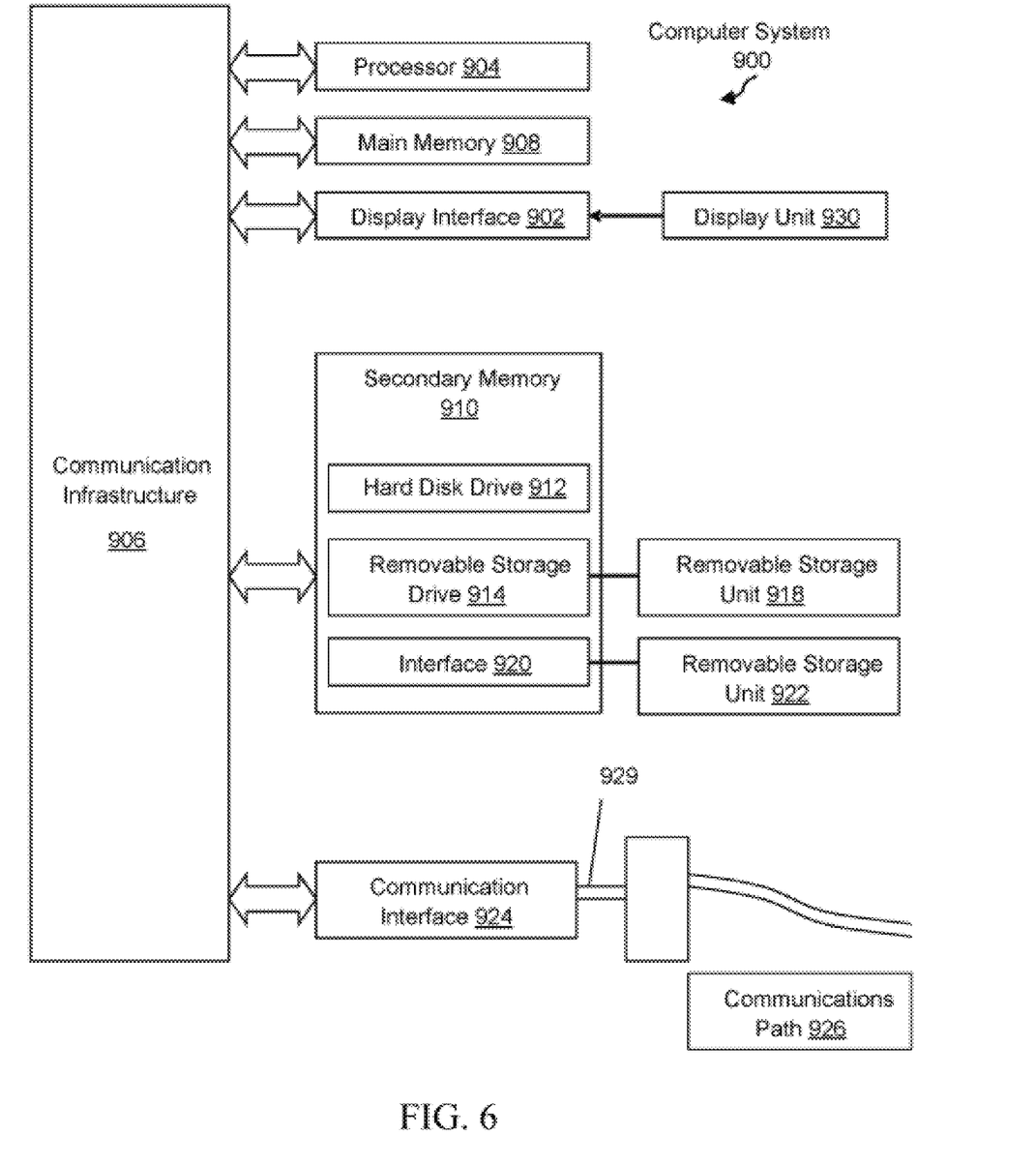
FIG. 6 is a diagram illustrating example aspects of a hardware implementation for a system employing a processing system in accordance with aspects of the present disclosure.

FIG. 6 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with one or more of the raw data critical information generating device, the COTS GPU, Monitoring Device, HWD and/or related processing within other components in the helmet of FIGS. 1-5. An example of such a computer system 900 is shown in FIG. 6.

Computer system 900 includes one or more processors, such as processor 904. The processor 904 may correspond to the monitoring device 106 described in connection with the critical symbol monitoring system 100. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 928. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 904 to perform the features presented herein. Accordingly, such computer programs represent controllers of the computer system 900.

In aspects implemented using software, the software may be stored in a computer program product and loaded into computer system 900 using removable storage drive 914, hard drive 912, or communications interface 920. The control logic (software), when executed by the processor 904, causes the processor 904 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 7:
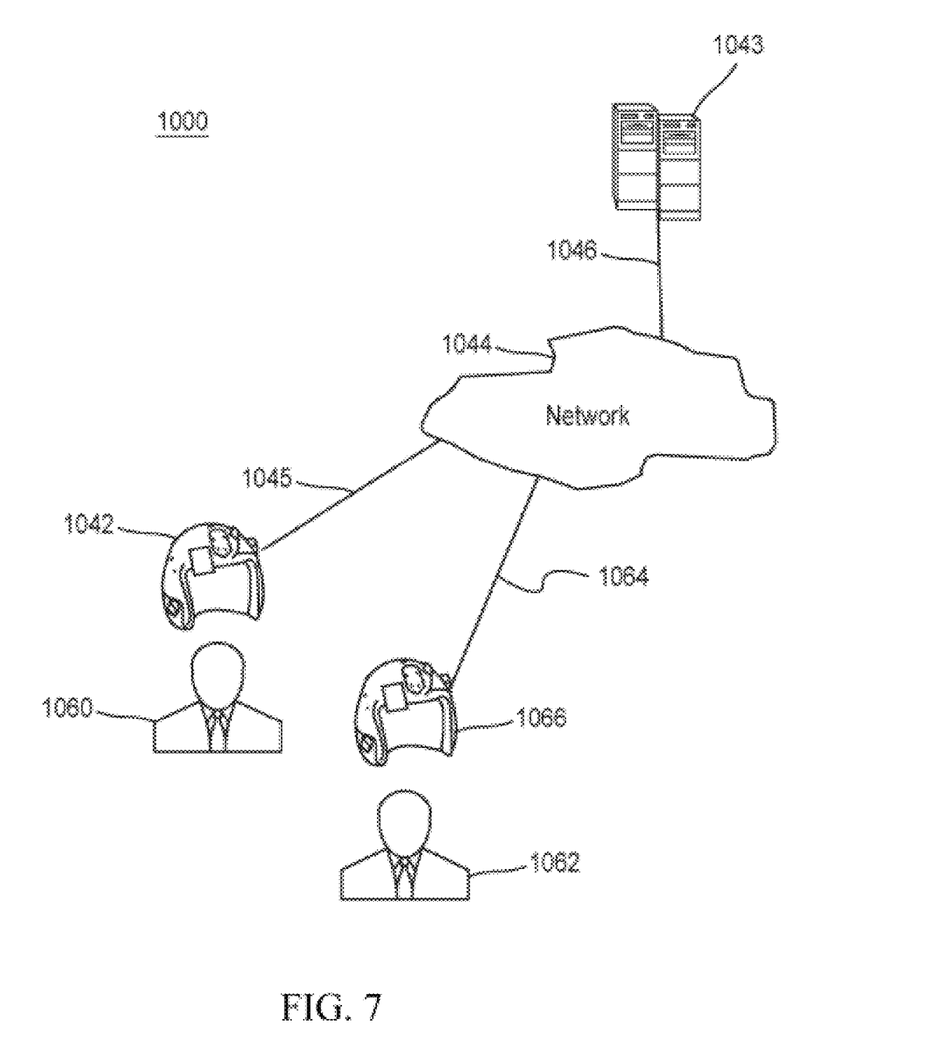
FIG. 7 is a block diagram illustrating various example system components for use in accordance with aspects of the present disclosure.

FIG. 7 illustrates a block diagram of various example system components that may be used in accordance with aspects of the present disclosure. The system 1000 may include one or more accessors 1060, 1062 (also referred to interchangeably herein as one or more "users") and one or more terminals 1042, 1066 (such terminals may be or include, for example, various features of the COTS GPU, Monitoring Device, HWD and/or related processing within other components in the helmet of FIGS. 1-5). In one aspect, data for use in accordance with aspects of the present disclosure is, for example, input and/or accessed by accessors 1060, 1062 via terminals 1042, 1066, coupled to a server 1043, such as the raw data critical information generating device, the COTS GPU, Monitoring Device, HWD and/or related processing within other components in the helmet of FIGS. 1-5, and/or other device having a processor and a repository for data and/or connection to a repository for data, via, for example, a network 1044, such as the Internet, an intranet, and/or an aircraft communication system, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described above may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, digital versatile disc (DVD), and floppy disk, where disks usually reproduce data magnetically, while discs reproduce data optically with lasers. Combinations of the above should also be included within the scope of computer-readable media.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of monitoring an output of a graphics processing unit, comprising:
   receiving a first data stream comprising critical information from a data generating device;
   receiving a second data stream comprising encoded critical information symbols from the graphics processing unit, wherein the encoded critical information symbols are based on the critical information and contain identification pixels;
   generating an estimated location for the critical information symbols within an image to be produced, based on the first data stream comprising the critical information;
   identifying a location of the identification pixels located within the encoded critical information symbols from the second data stream,
   comparing the identified location to the generated estimated location; and
   displaying the critical information symbols on a display when the comparison satisfies a threshold.

2. The method of claim 1, wherein the graphics processing unit generates the critical information symbols containing the identification pixels.

3. The method of claim 1, wherein the threshold is determined based upon an absolute distance between the identification pixels and the generated estimated location.

4. The method of claim 1, wherein the identification pixels are positioned in a specific location and provide a bit code.

5. The method of claim 4, wherein the bit code identifies which critical information symbol the identification pixels are encoded.

6. The method of claim 1, further comprising disregarding the critical information symbols when the comparison does not satisfy a threshold.

7. A system for monitoring an output of a graphics processing unit, comprising:

a memory; and a processor coupled to the memory and configured to:
- receive a first data stream comprising critical information from a data generating device;
- receive second data stream comprising encoded critical information symbols from the graphics processing unit, wherein the encoded critical information symbols are based on the critical information and contain identification pixels;
- generate an estimated location for the critical information symbols within an image to be produced, based on the first data stream comprising the critical information;
- identify a location of the identification pixels located within the encoded critical information symbols from the second data stream, and
- compare the identified location to the generated estimated location; and a display to display the critical information symbols when the comparison satisfies a threshold.

8. The system of claim 7, wherein the graphics processing unit generates the critical information symbols containing the identification pixels.

9. The system of claim 7, wherein the threshold is determined based upon an absolute distance between the identification pixels and the generated estimated location.

10. The system of claim 7, wherein the identification pixels are positioned in a specific location and provide a bit code.

11. The system of claim 10, wherein the bit code identifies which critical information symbol the identification pixels are encoded.

12. The system of claim 7, wherein when the comparison does not satisfy a threshold, disregarding the critical information symbols.

13. A non-transitory computer-readable recording medium having stored therein a program, which when executed by circuitry of a system, causes the system to:
- receive a first data stream comprising critical information from a data generating device;
- receive second data stream comprising encoded critical information symbols from a graphics processing unit, wherein the encoded critical information symbols are based on the critical information and contain identification pixels;
- generate an estimated location for the critical information symbols within an image to be produced, based on the first data stream comprising the critical information;
- identify a location of the identification pixels located within the encoded critical information symbols from the second data stream,
- compare the identified location to the generated estimated location; and
- display the critical information symbols on a display when the comparison satisfies a threshold.

14. The non-transitory computer-readable recording medium of claim 13, wherein the graphics processing unit is caused to produce the critical information symbols containing the identification pixels.

15. The non-transitory computer-readable recording medium of claim 13, wherein the threshold is determined based upon an absolute distance between the identification pixels and the generated estimated location.

16. The non-transitory computer-readable recording medium of claim 13, wherein the identification pixels are positioned in a specific location and provide a bit code.

17. The non-transitory computer-readable recording medium of claim 16, wherein the bit code identifies which critical information symbol the identification pixels are encoded.

18. The non-transitory computer-readable recording medium of claim 13, causes the system to disregard the critical information symbols when the comparison does not satisfy a threshold.

* * * * *